United States Patent
Sato et al.

(10) Patent No.: US 8,474,645 B2
(45) Date of Patent: Jul. 2, 2013

(54) WATERPROOF CASE

(75) Inventors: Koki Sato, Kakegawa (JP); Yasuhito Suzuki, Kakegawa (JP)

(73) Assignee: Yazaki Corporation, Tokyo (JP)

(*) Notice: Subject to any disclaimer, the term of this patent is extended or adjusted under 35 U.S.C. 154(b) by 49 days.

(21) Appl. No.: 13/176,369

(22) Filed: Jul. 5, 2011

(65) Prior Publication Data

US 2012/0006819 A1    Jan. 12, 2012

(30) Foreign Application Priority Data

Jul. 6, 2010  (JP) ................................. 2010-153644

(51) Int. Cl.
  *B65D 45/16*      (2006.01)
  *H01R 13/506*     (2006.01)

(52) U.S. Cl.
  USPC ........................... 220/324; 220/4.02; 174/562

(58) Field of Classification Search
  USPC ........... 174/562, 561, 560, 559, 520; 220/3.2, 220/4.01
  IPC .................. B65D 45/16; H01R 13/508,13/506, H01R 13/502
  See application file for complete search history.

(56) References Cited

U.S. PATENT DOCUMENTS

| | | | | |
|---|---|---|---|---|
| 4,223,796 A | * | 9/1980 | Silver | 220/3.8 |
| 6,545,217 B2 | * | 4/2003 | Sato | 174/50 |
| 2003/0136780 A1 | * | 7/2003 | Sato et al. | 220/3.8 |
| 2005/0082081 A1 | * | 4/2005 | Marcou et al. | 174/67 |
| 2006/0089020 A1 | * | 4/2006 | Kanamaru | 439/76.2 |
| 2008/0299798 A1 | * | 12/2008 | Yoshida et al. | 439/76.2 |

FOREIGN PATENT DOCUMENTS

JP   05338660 A  * 12/1993
JP   2004-064872    2/2004

* cited by examiner

*Primary Examiner* — Robert J Hicks
(74) *Attorney, Agent, or Firm* — Edwards Wildman Palmer LLP

(57) ABSTRACT

There is provided a waterproof case which prevents ingress of water into the waterproof case through a protection piece, including a case body formed into a rectangular tube-like shape with a peripheral wall thereof and a lower cover having a bottom wall covering a lower opening of the case body and a peripheral wall extending from the bottom wall. The peripheral wall of the body case is placed so as to cover the peripheral wall of the lower cover. The protection piece is provided at the peripheral wall of the lower cover so as to sandwich the peripheral wall of the case body with the peripheral wall of the lower cover to prevent the deformation of the peripheral wall of the lower cover. There is also provided a protrusion protruding from a surface of the peripheral wall of the case body on which the protection piece is placed.

10 Claims, 6 Drawing Sheets

WATERPROOF CASE

CROSS REFERENCE TO RELATED APPLICATION

The priority application Japanese Patent Application No. 2010-153644 upon which this patent application is based is hereby incorporated by reference.

BACKGROUND OF THE INVENTION

1. Field of the Invention

The present invention relates to a waterproof case to be attached to, for example, an engine room of a motor vehicle and which is suitable for use as an electrical connection box receiving therein electrical components such as a fuse or a relay.

2. Description of the Related Art

A motor vehicle is provided with an electrical connection box arranged at an suitable location within the vehicle to supply electricity from a source to a variety of electrical equipments mounted on the vehicle. There are a wide variety of electrical connection boxes depending on a type of the vehicle. One example of such electrical connection box is disclosed in Japanese Patent Application Publication No. 2004-64872 and is illustrated in FIGS. 4 through 6 as an electrical connection box 110. As shown in the figures, the conventional electrical connection box 110 includes a waterproof case 11 arranged to receive several electrical components, and the waterproof case 11 is provide with a case body 13 made of synthetic resins, an upper cover (not shown) attached to an upper portion of the case body 13, and a lower cover 14 attached to a lower portion of the case body 13. The electrical connection box 110 is arranged to be attached to, for example, an engine room of the vehicle.

Referring to FIG. 6 which shows an enlarged cross-sectional view of the waterproof case 11, a peripheral wall 131 of the case body 13 is placed so as to overlap with a peripheral wall 142 of the lower cover 14. Thus, a space formed between the peripheral wall 131 of the case body 13 and the peripheral wall 142 of the lower cover 14 opens downward in a vertical direction, thereby preventing water flowing down along the peripheral wall 131 from entering the waterproof case 11 via the above-described space between the peripheral wall 131 and the peripheral wall 142.

However, for the above-described conventional waterproof case 11, if the waterproof case 11 is squirted with water or washing liquid, for example during car washing, there is a possibility of the ingress of the water or the liquid into the waterproof case 11. This may cause a failure in the electrical components or a leak of current or other undesirable problems.

More specifically, for example during the car wash the squirted water or the washing liquid directly hits the peripheral wall 142 of the lower cover 14, exerting a force on the peripheral wall 142. Thus, the peripheral wall 142 may be deformed inward, and this deformation may in turn causes widening of the space between the peripheral wall 131 of the case body 13 and the peripheral wall 142 of the lower cover 14. As a result, the water may enter the waterproof case 11 through that space. In view of this, there is provided a protection piece 143 arranged at the peripheral wall 142 of the lower cover 14. This protection piece 143 is arranged so as to overlap with a portion of the peripheral wall 131 of the case body 13, so that the portion of the peripheral wall 131 of the case body 13 is sandwiched between the protection piece 143 and the peripheral wall 142 of the lower cover 14. In such manner, the inward deformation of the peripheral wall 142 of the lower cover 14 due to the force exerted by the water hitting on the lower cover 14 can be prevented. Thus, the ingress of the water into the waterproof case 11 can be prevented.

However, there is still a problem that the above-described protection piece 143 cannot reliably prevent the ingress of the water into the waterproof case 11, since the water flowing on the peripheral wall 131 of the case body 13 may enter the waterproof case 11 through a space between the peripheral wall 131 and the protection piece 143 along a path indicated with an arrow Y3 in FIG. 6.

SUMMARY OF THE INVENTION

An object of the present invention is thus to provide a waterproof case which can prevent the ingress of the water into the waterproof case through the protection piece described above.

In order to achieve the above-mentioned object, the present invention provides, in a first aspect, a waterproof case including a case body formed into a box-like shape with a peripheral wall of the case body, a cover having a bottom wall and a peripheral wall extending perpendicularly from the bottom wall, the bottom wall covering an opening formed by an edge of the peripheral wall of the case body, the peripheral wall of the cover being arranged adjacent to the peripheral wall of the case body in an overlapping manner, and a protection piece extending from the peripheral wall of one of the cover and the case body, the one of the cover and the case body being located at a lower position in a vertical direction with respect to the other one of the cover and the case body. The protection piece is arranged such that a lower end portion of the peripheral wall of the other one of the cover and the case body is sandwiched between the protection piece and the peripheral wall of the one of the case body and the cover so that the protection piece prevents the peripheral wall of the one of the case body and the cover from being deformed inward. Furthermore, a protrusion is provided at the peripheral wall of the other one of the case body and the cover, the protrusion being arranged to protrude with respect to a surface of the other one of the case body and the cover on which the protection piece is placed such that a lower end surface of the protrusion is arranged on an upper end surface of the protection piece.

According to the first aspect of the prevent invention described above, the lower end surface of the protrusion of the peripheral wall of the other one of the case body and the cover is arranged on the upper end surface of the protection piece. Thus, this protrusion serves to cover an upward opening of a space formed between the protection piece and the peripheral wall of the other one of the case body and the cover. As a result, the water can be prevented from entering the waterproof case via the upward opening of the space between the protection piece and the peripheral wall of the other one of the case body and the cover.

The present invention further provides, in a second aspect, the waterproof case provided with a through hole formed at a lower end portion of the protection piece.

According to the second aspect of the prevent invention described above, even if the water had entered the space between the protection piece and the peripheral wall of the other one of the case body and the cover, the water is directed to exit outside from the through hole. Thus, the ingress of the water into the waterproof case can be prevented even more reliably.

The present invention further provides, in a third aspect, the protection piece provided with a thick portion projecting from the protection piece and arranged around the through hole of the protection piece.

According to the third aspect of the prevent invention described above, the thick portion helps avoiding production of a welding line caused by providing the through hole.

DETAILED DESCRIPTION OF THE INVENTION

Figure 1:
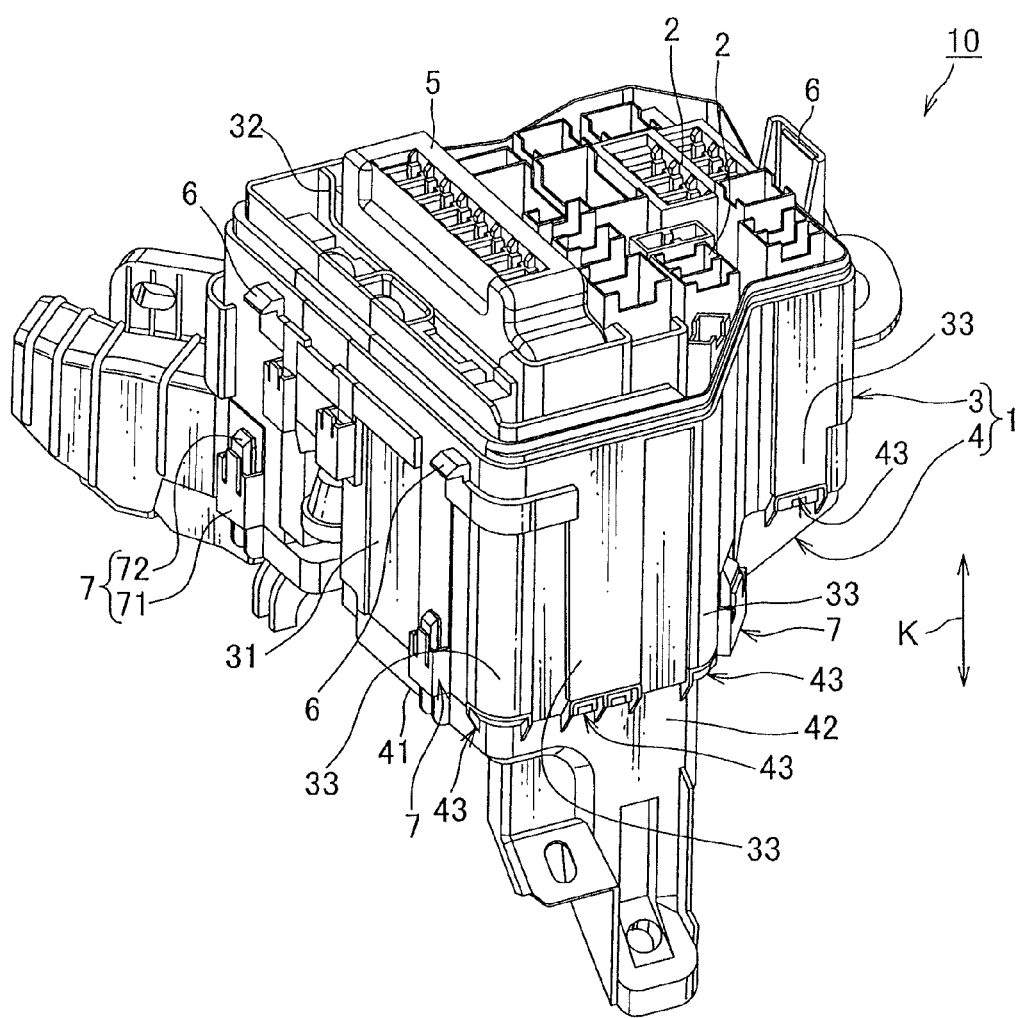
FIG. 1 is a perspective view of an electrical connection box having a waterproof case of the present invention according to one embodiment.
Figure 2:
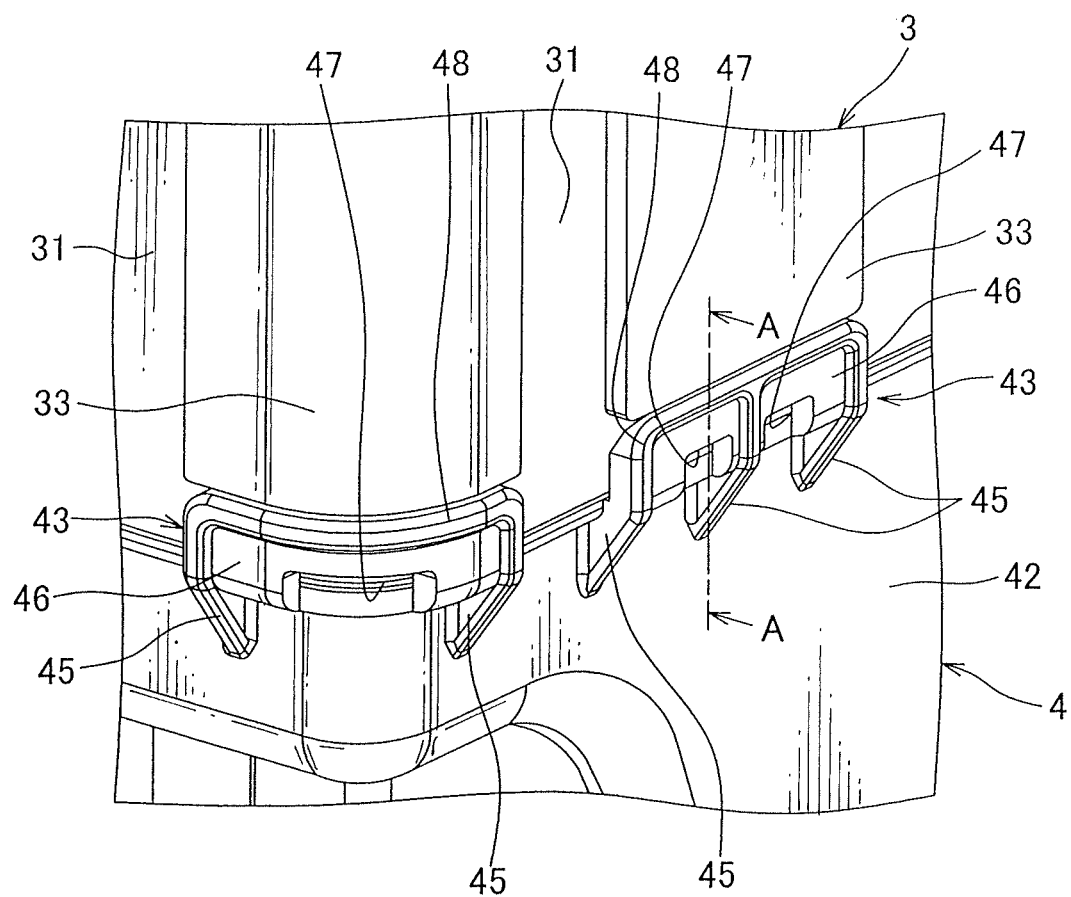
FIG. 2 is an enlarged view of a portion of the waterproof case of FIG. 1.
Figure 3:
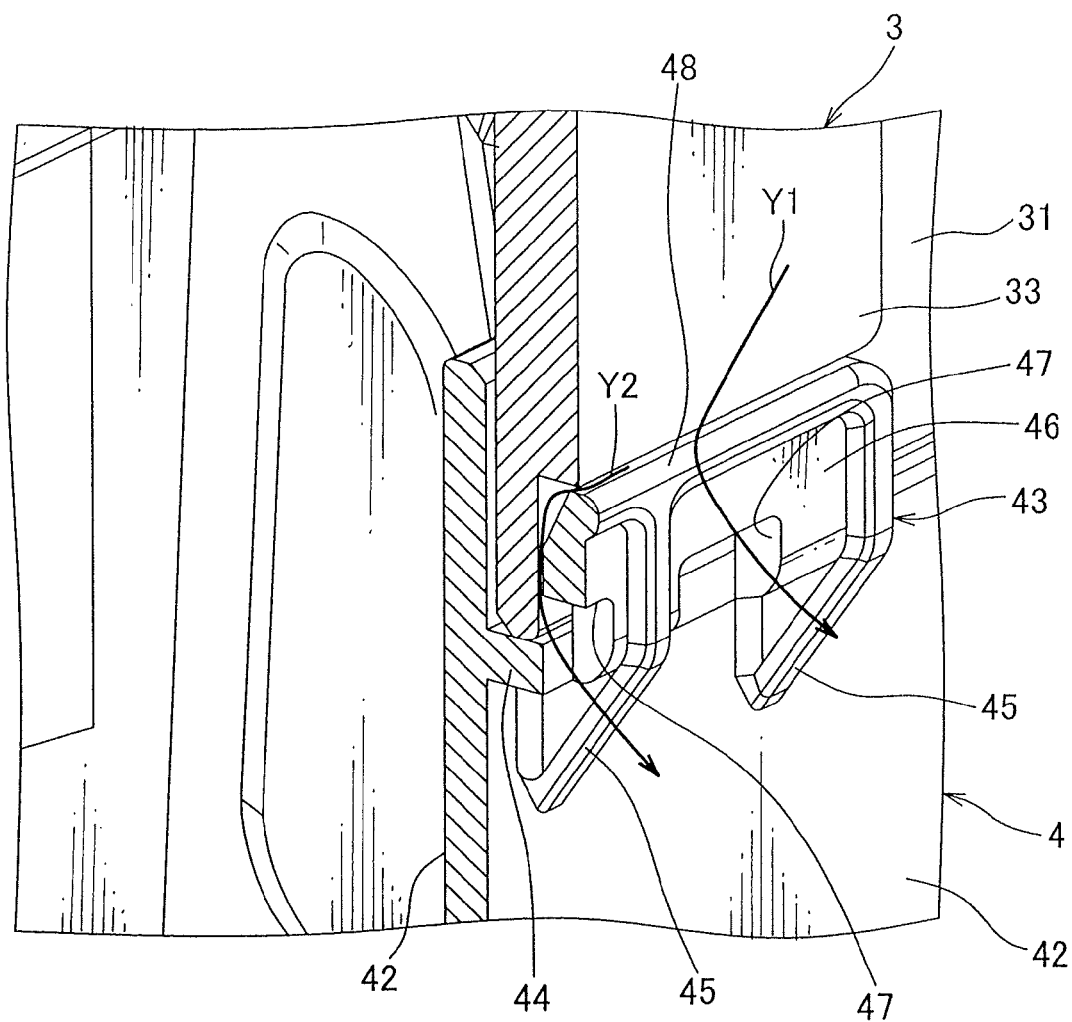
FIG. 3 is a cross-sectional view taken along an A-A line shown in FIG. 2.
Figure 3:
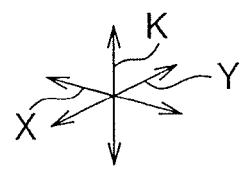
Figure 4:
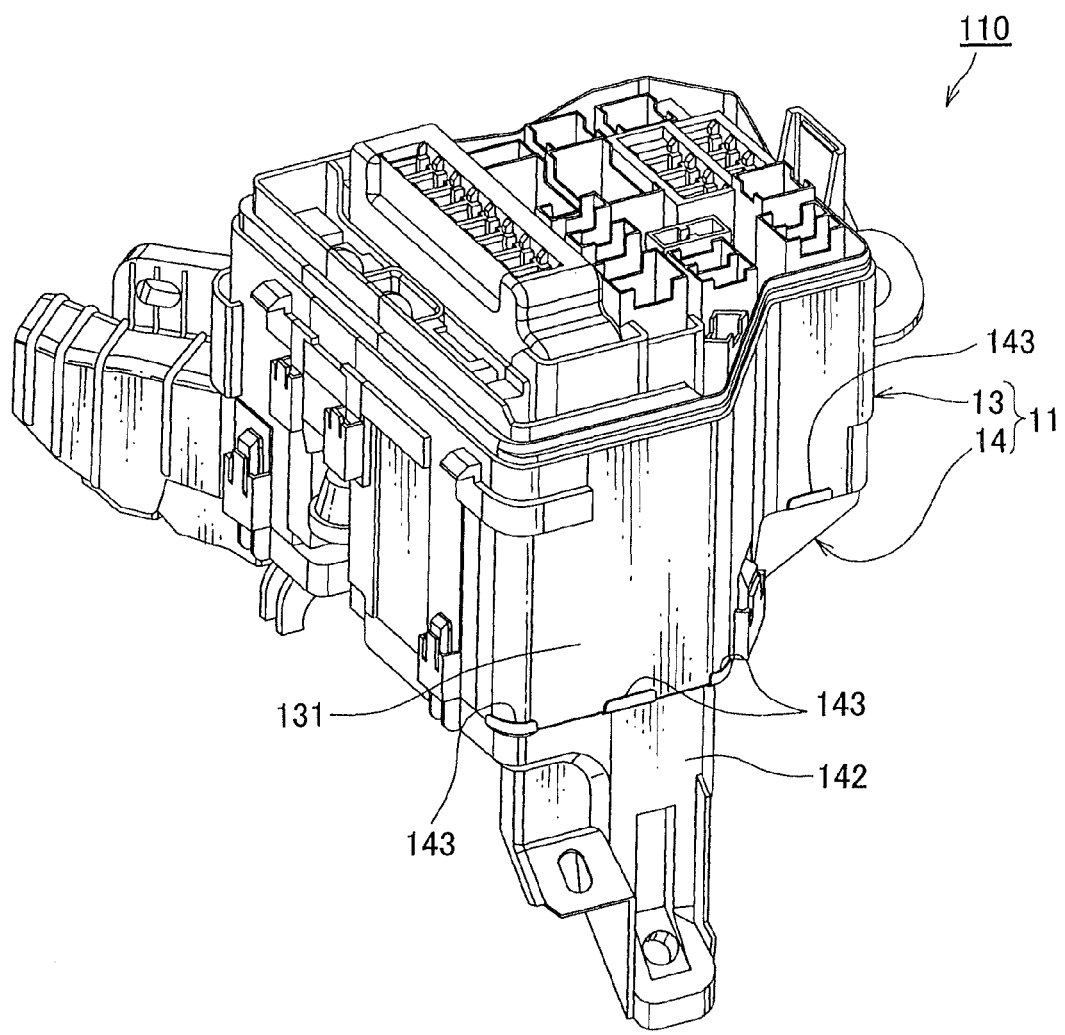
FIG. 4 is a perspective view of a conventional waterproof case.
Figure 5:
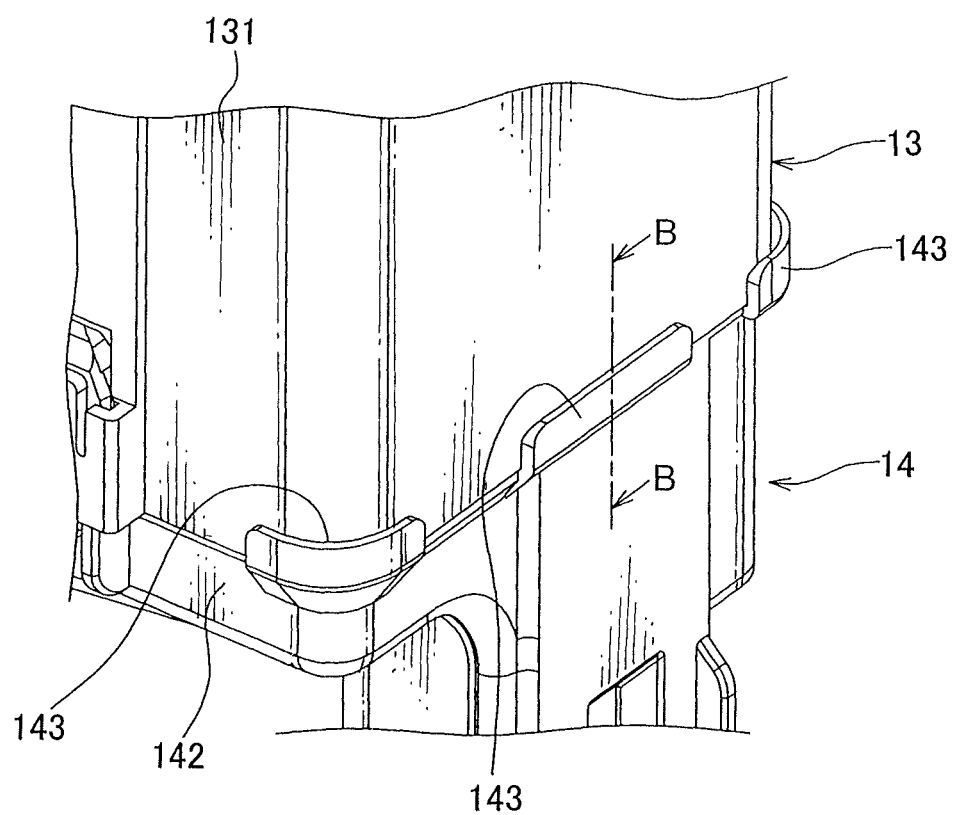
FIG. 5 is an enlarged view of a portion of the conventional waterproof case of FIG. 4.
Figure 6:
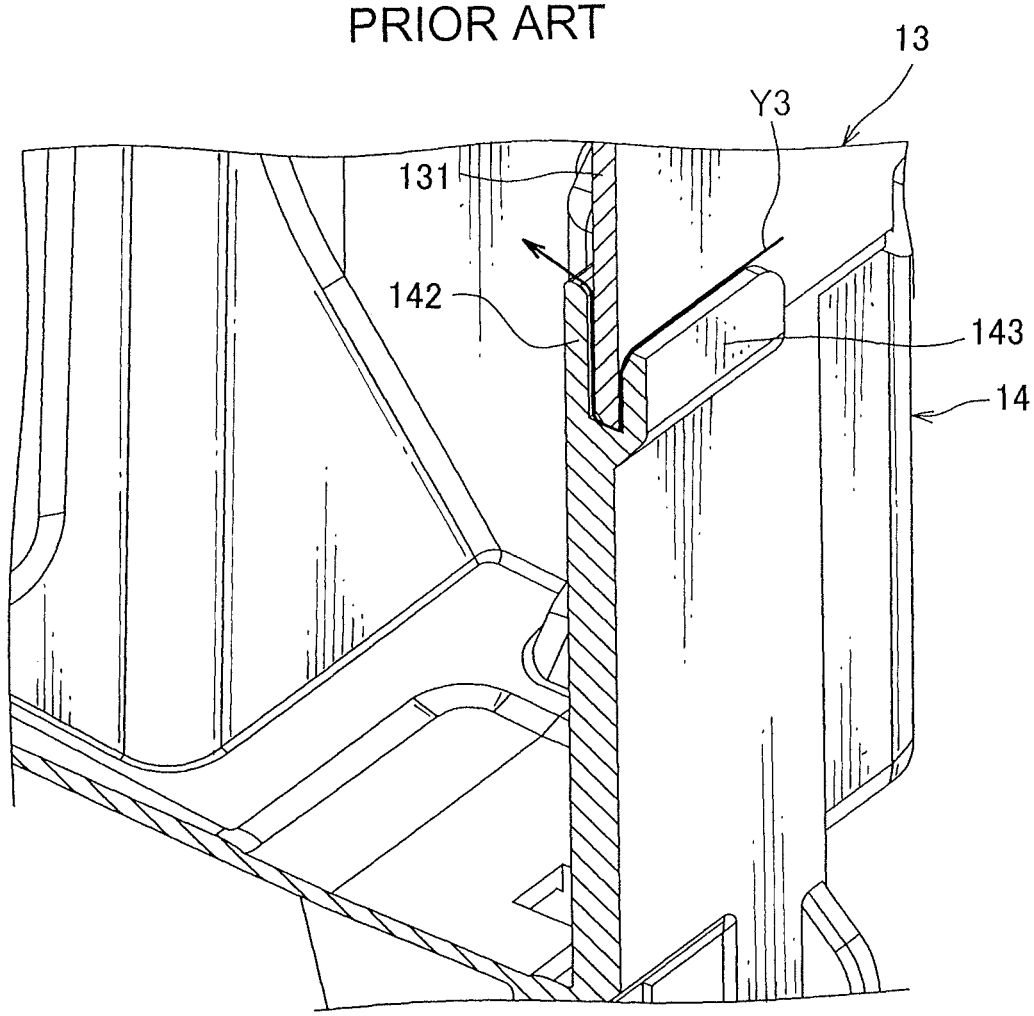
FIG. 6 is a cross-sectional view taken along a B-B line shown in FIG. 5.

The following will describe a waterproof case of the present invention according to one embodiment in reference with FIGS. 1 through 3. FIG. 1 is an illustration of an electrical connection box having the waterproof case of the present invention according to one embodiment, in which an upper cover provided to the waterproof case is eliminated and not shown. FIG. 2 is an enlarged view of the waterproof case of FIG. 1. FIG. 3 is a cross-sectional view taken along a line A-A shown in FIG. 2.

Referring to FIG. 1, an electrical connection box 10 includes a waterproof case 1 forming a framework of the electrical connection box 10 and receiving a plurality of electrical components such as a connector of a wire harness, a relay, a fuse or an electricity distributor referred to as a power integration unit (hereinafter called a P/I unit) 5. The electrical connection box 10 is arranged to be attached to, for example, an engine room of a motor vehicle and serves to electrically connect the electrical components with various electrical equipments mounted on the other places within the vehicle.

The electrical connection box 10 further includes a cassette block 2 received within the waterproof case 1 and holding the plurality of electrical components. The waterproof case 1 of the present invention serves to protect the above-described electrical components received in the waterproof case 1 from water or any liquid.

The term "waterproof" used herein should be broadly interpreted as function or an object resisting the ingress of liquid in general (i.e. not only water but oil, alcohol and such).

In addition, the cassette block 2 described above is made of synthetic resins and is formed using a known injection molding. The electrical components such as a fuse, a fusible link, a relay or a bus bar are mounted to the cassette block 2.

The waterproof case 1 further includes a case body 3 receiving the above-described cassette block 2, an upper cover (not shown) removably attached to an upper portion of the case body 3, and a lower cover 4 removably attached to a lower portion of the case body 3. The case body 3, the upper cover and the lower cover 4 are made of synthetic resins and are formed using a well-known injection molding. Throughout the specification, the terms of "lower", "upper", "downward" and "upward" used herein are interpreted in relation to a K direction indicated in FIGS. 1 through 3, and the K direction corresponds to a vertical direction with respect to the waterproof case 1.

As shown in FIG. 1, the case body 3 is formed into a substantially rectangular tubular box-like shape with a peripheral wall 31 extending along the K direction. The peripheral wall 31 is formed with a plurality of wall pieces continuous with each other. The case body 3 is provided with an upper opening and a lower opening formed by an upper edge and a lower edge of the peripheral wall 31, respectively. Thus, the upper opening and the lower opening of the case body 3 are located at an upper end and a lower end of the case body 3, respectively, in the K direction. The case body 3 further includes a mounting portion 32 to which the P/I 5 is mounted. The P/I 5 includes a fuse and a relay attached thereto and a base plate (not shown) having thereon a circuit pattern of the fuse and the relay.

The upper cover (not shown) described above includes a bottom wall arranged to cover the upper opening of the case body 3 and a peripheral wall extending downward from a periphery of the bottom wall. Thus, the upper cover is formed into a box opening downward in the K direction and is attached to the case body 3 so as to cover the upper opening of the case body 3.

The upper cover is attached to the case body 3 such that a lower end portion of the peripheral wall of the upper cover is overlapped with the upper end portion of the peripheral wall 31 of the case body 3. That is, the peripheral wall of the upper cover is located so as to cover the peripheral wall 31 of the case body 3. Thus, a space formed between the peripheral wall 31 of the case body 3 and the peripheral wall of the upper cover opens downward in the K direction. In such a manner, the water flowing along the peripheral wall of the upper cover can be prevented from entering the waterproof case 1 through the above-described space between the peripheral wall of the upper cover and the peripheral wall 31 of the case body 3.

Furthermore, a plurality of locking portions are provided to the peripheral wall 31 of the case body 3 and to the peripheral wall of the upper cover to fix the upper cover to the case body 3. The respective locking portions include a locking projection 6 projecting from the peripheral wall 31 of the case body 3 and a locking arm (not shown) projecting downward from the peripheral wall of the upper cover. The locking arm is arranged to engage with the locking projection 6 of the peripheral wall 31 of the case body 3.

The lower cover 4 includes a bottom wall 41 covering the lower opening of the case body 3 and a peripheral wall 42 extending upward from a periphery of the bottom wall. Thus, the lower cover 4 is formed into a box opening upward in the K direction and is attached to the case body 3 so as to cover the lower opening of the case body 3.

Furthermore, as shown in FIG. 3, the lower cover 4 is attached to the case body 3 such that an upper end portion of the peripheral wall 42 of the lower cover 4 is overlapped with the lower end portion of the peripheral wall 31 of the case body 3 such that the peripheral wall 42 of the lower cover 4 is located inside the peripheral wall 31 of the case body 3. Thus, a space formed between the peripheral wall 31 of the case body 3 and the peripheral wall 42 of the lower cover 4 opens downward in the K direction, thereby preventing water flowing along the peripheral wall 31 of the case body 3 from entering the waterproof case 1 through the space between the peripheral wall 42 of the lower cover 4 and the peripheral wall 31 of the case body 3.

Furthermore, as shown in FIG. 1, a plurality of locking portions 7 are provided to the peripheral wall 31 of the case body 3 and to the peripheral wall 42 of the lower cover 4 to fix the case body 3 and the lower cover 4 with each other. The respective locking portions 7 include an engagement portion 71 projecting outwardly from the peripheral wall 31 of the case body 3 and having a C-like cross-sectional shape and a locking arm 72 projecting upward in the K direction from the peripheral wall 42 of the lower cover 4. The locking arm 72 is received within an engagement aperture formed between the peripheral wall 31 of the case body 3 and the engagement portion 71 and engaged with the engagement portion 71.

Furthermore, the peripheral wall 42 of the lower cover 4 is provided with a plurality of protection pieces 43 that prevents the peripheral wall 42 of the lower cover 4 from being deformed inward (as described below, the plurality of protection pieces 43 may be provided at the peripheral wall 31 of the case body 3). Thus, in this embodiment the peripheral wall 42 of the lower cover 4 corresponds to "the peripheral wall of one of the case body and the cover" described in the claims. The protection piece 43 includes a bottom wall portion 44 arranged to project from the peripheral wall 42 of the lower cover 4 so that a lower end surface of the peripheral wall 31 of the case body 3 is placed on the bottom wall portion 44, as shown in FIG. 3. The protection piece 43 further includes a plurality of reinforcing ribs 45 projecting downward from the bottom wall portion 44 and a protection body 46 projecting upward from an outer edge of the bottom wall portion 44.

The plurality of reinforcing ribs 45 is arranged in parallel with respect to each other as well as perpendicular with respect to both of the bottom wall portion 44 and the peripheral wall 42 of the lower cover 4. The plurality of reinforcing ribs 45 serves to support and reinforce the lower side of the bottom wall portion 44. Furthermore, the reinforcing ribs 45 are provided respectively at both ends of the bottom wall portion 44 along a Y direction shown in FIG. 3, the Y direction being orthogonal to the K direction and to an X direction perpendicular to a surface of the peripheral wall 42. If the protection piece 43 employed is relatively large in size, then another rib 45 may be provided at a middle of the bottom wall portion 44 in addition to the both ends of the bottom wall portion 44. In addition, the respective ribs 45 include a slanted portion slanted with respect to the peripheral wall 42 such that a lower end of the slanted portion is closer to the peripheral wall 42 than an upper end of the slanted portion (again, the terms of "lower" and "upper" used herein are interpreted in relation to the K direction).

The protection body 46 extends upward from the bottom wall 44 so as to be placed on an outer surface of the lower end portion of the peripheral wall 31 of the case body 3. That is, the lower end portion of the peripheral wall 31 of the case body 3 is sandwiched between the protection body 46 and the peripheral wall 42 of the lower cover 4. Consequently, the peripheral wall 42 of the lower cover 4 can be prevented from being deformed inward due to the force exerted by the squirted water or the washing liquid hitting directly on the peripheral wall 42 of the lower cover 4. Thus, in this embodiment, the peripheral wall 31 of the case body 3 corresponds to "the peripheral wall of the other one of the case body and the cover" described in the claims.

As described above for the conventional waterproof case 11, the space between the protection piece 143 and the peripheral wall 131 of the case body 13 forms an upward opening which opens upward in the K direction, thus the water flowing down the peripheral wall 131 may enter the waterproof case 11 through that upward opening. In the present invention, on the other hand, such ingress of the water into the waterproof case can be prevented by providing a protrusion 33 arranged at the peripheral wall 31 of the case body 3 and extending along the K direction. This protrusion 33 is arranged to protrude with respect to the outer surface of the peripheral wall 31 on which the protection body 46 is placed, such that a lower end surface of the protrusion 33 is arranged on an upper end surface of the protection body 46.

In such manner, the protrusion 33 serves to cover the upward opening of the space between the protection piece 43 and the peripheral wall 31 of the case body 3, as shown in FIGS. 2 and 3. Thus, the protrusion 33 advantageously prevents the water flowing down along the peripheral wall 31 of the case body 3 from entering the waterproof case 1 as shown in FIG. 3 with an arrow Y3.

In addition, in order to more effectively prevent the ingress of the water into the waterproof case 1, the above-described embodiment of the present invention further includes a through hole 47 provided at a lower end portion of the protection body 46 as shown in FIGS. 2 and 3. If the protection piece 43 employed is relatively large in size, then total of two through holes 47 may be provided to the protection body 46, in which each through hole 47 is provided between the ribs 45. If the protection piece 43 employed is relatively small in size, then the single through hole 47 may be provided at a middle of the protection body 46 in the Y direction.

By providing the through hole 47 in a manner as described above, even if the water has entered the space between the protection body 46 and the peripheral wall 31 of the case body 3, the water exits out of the space from the through hole 47, as shown in FIG. 3 with an arrow Y2. As a result, the ingress of the water into the waterproof case 1 can be prevented even more reliably.

Meanwhile, providing the above-described through hole 47 to the protection body 46 may cause a formation of a welding line at the protection body 46 when forming the protection body 46 using the injection molding. This is because, during the injection molding, one and the other resin flows flowing from opposing sides along the Y direction towards each other contact with each other, thereby forming the welding line at this contacted portion. Thus, in order to avoid the production of such welding line, the present invention is provided with a thick portion 48 which is concaved outwardly with respect to the protection body 46 and which is arranged around the through hole 47, as shown in FIGS. 2 and 3.

If the protection body 46 includes only one through hole 47, then the thick portion 48 is arranged vertically at both edges of the protection body 46 located in the Y direction and at an upper edge of the protection body 46. If the protection body 46 includes two or more through holes 47, then the thick portion 48 is also arranged vertically between the through holes 47, in addition to at the both edges of the protection body 46 in the Y direction and at the upper edge of the protection body 46.

By providing the thick portion 48 in a manner described above, the resin flow can be directed towards the thick portion 48 during the injection molding, thereby preventing the formation of the welding line.

It should be understood that the present invention is not limited to the embodiment described above. According to the above-described embodiment, the through hole 47 is provided at the protection body 46; however the through hole 47 may be eliminated if sufficient waterproof effect can be achieved by using only the protrusion 33.

Furthermore, according to the above-described embodiment, the thick portion 48 is formed on the protection body 46; however, the protection body 46 may have a uniform thickness.

Furthermore, according to the above-described embodiment, the protrusion 33 is formed convexly with respect to the peripheral wall 31 of the case body 3 along the K direction; however, the present invention is not limited to this. The protrusion 33 may be formed in a different manner as long as the protrusion 33 is protruded with respect to the surface of the peripheral wall 31 on which the protection piece 43 is placed. For example, the surface of the peripheral wall 31 on which the protection body 46 is placed can be formed in a concaved shape to form the protrusion 33.

Furthermore, according to the above-described embodiment, the protection piece 43 is provided at the lower cover 4; however the present invention is not limited to this. For example, the protection piece 43 may be provided at the case body 3, such that the lower end portion of the peripheral wall of the upper cover is sandwiched between the peripheral wall 31 of the case body 3 and the protection body 46 to prevent the case body 3 from being deformed inward. In this case, the protrusion 33 is provided at the peripheral wall of the upper cover. Thus, in this embodiment the peripheral wall 31 of the case body 3 corresponds to "the peripheral wall of one of the case body and the cover" described in the claims, while the peripheral wall of the upper cover corresponds to "the peripheral wall of the other one of the case body and the cover" described in the claims.

As described above, the embodiments described herein are only representative embodiments and are not intended to limit the present invention. It will be understood that various modifications to the embodiments may be made without departing the scope of the present invention.

What is claimed is:

1. A waterproof case comprising,
a case body formed with a peripheral wall of the case body,
a cover having a bottom wall and a peripheral wall extending perpendicularly from the bottom wall,
the bottom wall covering an opening formed by an edge of the peripheral wall of the case body,
the peripheral wall of the cover being arranged adjacent to the peripheral wall of the case body in an overlapping manner, and
a protection piece extending from the peripheral wall of one of the cover and the case body,
the one of the cover and the case body being located at a lower position in a vertical direction with respect to the other one of the cover and the case body, wherein
the protection piece is arranged such that a lower end portion of the peripheral wall of the other one of the cover and the case body is sandwiched between the protection piece and the peripheral wall of the one of the case body and the cover so that the protection piece prevents the peripheral wall of the one of the case body and the cover from being deformed inward, and wherein
a protrusion is provided at the peripheral wall of the other one of the case body and the cover,
the protrusion being arranged to protrude with respect to a surface of the other one of the case body and the cover on which the protection piece is placed such that a lower end surface of the protrusion is arranged on an upper end surface of the protection piece.

2. The waterproof case according to claim 1, wherein the protection piece is provided with a through hole formed at a lower end portion of the protection piece.

3. The waterproof case according to claim 2, wherein the protection piece is provided with a thick portion projecting outwardly and arranged around the through hole.

4. The waterproof case according to claim 1, wherein the cover is located at a lower position than that of the case body in the vertical direction.

5. The waterproof case according to claim 1, wherein the protection piece is placed on the surface of the cover.

6. The waterproof case according to claim 1, wherein the protrusion is arranged on the surface of the case body.

7. The waterproof case according to claim 1, wherein the protrusion is arranged to protrude from a surface of the protection piece.

8. The waterproof case according to claim 1, wherein the protection piece comprises:
   a bottom wall portion;
   a plurality of reinforcing ribs; and
   a protection body.

9. The waterproof case according to claim 8, wherein the ribs are arranged in parallel with respect to each other and perpendicular with respect to both of the bottom wall portion and the peripheral wall of the cover.

10. The waterproof case according to claim 8, wherein the protection body extends upward from the bottom wall so as to be placed on an outer surface of the lower end portion of the peripheral wall of the case body.

* * * * *